UNITED STATES PATENT OFFICE.

HEINRICH SCHÄFER, OF DRESDEN, GERMANY.

COMPOUND FOR POLISHING LEATHER AND THE LIKE.

1,036,728. Specification of Letters Patent. Patented Aug. 27, 1912.

No Drawing. Application filed November 29, 1909. Serial No. 530,384.

*To all whom it may concern:*

Be it known that I, HEINRICH SCHÄFER, a citizen of Germany, residing at Dresden, Germany, have invented new and useful Improvements in Compounds for Polishing Leather and the Like, of which the following is a specification.

My invention relates to the manufacture of compounds for polishing leather, oil-cloth and the like.

More especially, the object of my invention is to produce a polishing compound of the well known saponaceous type, but while the known polishes of this type are of pasty or creamy consistency, my invention consists in producing saponaceous polishes in a solid form.

I am aware that solid polishes of the turpentine type are already known, which polishes are produced by drying the pasty mixtures or by employing a reduced quantity of turpentine-oil. But hitherto no one has produced solid saponaceous polishes because it was universally feared that the product would be of too hard a consistency and that it would not be possible to mollify or soften the polish for use.

I have found that a solid saponaceous polish can be obtained which can be regarded as a perfect substitute for the best creamy polishes.

In order to carry my invention into practice I proceed as follows: I melt wax, stearin, bitumen or the like saponifiable substances on the water-bath. Separately I mix glycerin with common caustic potash lye of 40° Bé., or with a solution of potash, and I heat this mixture up to 50° centigrade at least. I then slowly add the alkaline solution under constant stirring to the said molten wax or the like, until complete combination or saponification has resulted.

Along with the addition of the molten wax or after the saponification has taken place suitable oils or fats may be added to increase the preservation of the leather or the like. The mass may be colored in any suitable manner, the coloring matters being stirred up with the glycerin if soluble in water or added to the wax if soluble in fatty matter.

For instance, the following ingredients are made use of and mixed in the following proportions:

1.

| | | |
|---|---|---|
| Bees-wax | 100 | parts by weight. |
| Glycerin | 40 | " " " |
| Caustic potash lye, 10 to 20° Bé | 30 | " " " |
| Fatty coloring matter | 15 | " " " | or—

2.

| | | |
|---|---|---|
| Wax | 100 | parts by weight. |
| Shellac | 10 | " " " |
| Glycerin | 35 | " " " |
| Potash | 12 | " " " |
| Water | 15 to 20 | " " " |
| Fatty coloring matter | 15 | " " " |

When all ingredients are combined the hot solution is poured into suitable molds; after having cooled down the compound forms a completely solid mass. To make it ready for use it must be mollified or soaked in water. This is preferably effected in the well known manner in which formerly common blacking was treated, that is to say the polishing block is moistened with a small quantity of water, whereupon the desired quantity of polish is rubbed off by means of a smearing-brush, applied to the leather, allowed to dry and finally polished by means of the blacking-brush.

My improved polish is wholly different from the known saponaceous polishes. It is though in solid form, always ready for use and may be sold in paper wrappers whereby the expense for tins or glass boxes may be saved.

I claim:

1. A compound for polishing leather and the like, comprising the product resulting from the mixture of the following ingredients and compounded substantially in the following proportions, to wit: 100 parts wax, 35–40 parts glycerin, 12 parts caustic potash, 15–22 parts water and 15 parts fatty coloring matter.

2. A compound for polishing leather and the like, consisting of the product resulting from the mixture of the following ingredients and compounded substantially in the following proportions, to wit: 100 parts wax, 10 parts shellac, 35 parts glycerin, 12 parts caustic potash, 15–22 parts water and 15 parts fatty coloring matter, substantially as described.

In testimony whereof I have signed my name to this specification in the presence of two subscribing witnesses.

HEINRICH SCHÄFER.

Witnesses:
 PAUL ARRAS,
 CLÄRE SIMON.